United States Patent
Barnwell

(10) Patent No.: US 7,828,881 B2
(45) Date of Patent: Nov. 9, 2010

(54) FILTER ASSEMBLY AND METHOD

(75) Inventor: James W Barnwell, Moravian Falls, NC (US)

(73) Assignee: Flair Corporation, Ocala, FL (US)

( * ) Notice: Subject to any disclaimer, the term of this patent is extended or adjusted under 35 U.S.C. 154(b) by 0 days.

(21) Appl. No.: 12/608,884

(22) Filed: Oct. 29, 2009

(65) Prior Publication Data

US 2010/0043637 A1    Feb. 25, 2010

Related U.S. Application Data

(63) Continuation of application No. 11/826,474, filed on Jul. 16, 2007, now Pat. No. 7,618,480.

(51) Int. Cl.
*B01D 46/00* (2006.01)

(52) U.S. Cl. .............. 95/273; 55/486; 55/498; 55/502; 55/504; 55/DIG. 17; 210/443; 210/444

(58) Field of Classification Search .............. 55/421, 55/423, 486, 487, 498, 502, 504, 505, 507, 55/508, DIG. 17; 95/273; 210/443, 444, 210/452

See application file for complete search history.

(56) References Cited

U.S. PATENT DOCUMENTS

| | | | |
|---|---|---|---|
| 2,915,188 A | 12/1959 | Buker | |
| 3,199,676 A | 8/1965 | May | |
| 3,228,527 A | 1/1966 | McPherson | |
| 3,887,469 A | 6/1975 | Hayashi | |
| 4,051,042 A | 9/1977 | Tullier et al. | |
| 4,272,368 A | 6/1981 | Foord et al. | |
| 4,609,459 A | 9/1986 | Hendrix | |
| 4,668,256 A * | 5/1987 | Billiet et al. ............... 96/409 |
| 4,925,466 A | 5/1990 | Overby | |
| 5,298,160 A | 3/1994 | Ayers et al. | |
| 5,653,870 A | 8/1997 | Tsuchiya et al. | |
| 6,391,197 B1 | 5/2002 | Billiet | |
| 6,409,786 B1 | 6/2002 | Wright et al. | |
| 6,412,435 B1 | 7/2002 | Timmons, Jr. | |
| 6,416,563 B1 | 7/2002 | Wright et al. | |
| 6,440,201 B1 | 8/2002 | Billiet | |
| 6,461,397 B1 | 10/2002 | Billiet | |
| 6,663,685 B2 | 12/2003 | Wright et al. | |
| 6,740,235 B2 * | 5/2004 | Gill ............................ 210/238 |
| 6,918,521 B2 | 7/2005 | Settelmayer et al. | |
| 6,919,023 B2 | 7/2005 | Merritt et al. | |
| 6,936,084 B2 | 8/2005 | Schlensker et al. | |

(Continued)

FOREIGN PATENT DOCUMENTS

DE    4335451 A1    4/1995

(Continued)

*Primary Examiner*—Michael A Marcheschi
*Assistant Examiner*—Robert A Clemente
(74) *Attorney, Agent, or Firm*—Baker & Hostetler LLP

(57) ABSTRACT

A filter assembly having a filter head having inlet and outlet ports and a top cap having a substantially curved, non-planar flange portion, the non-planar flange sealingly received within the filter head such that the filter head is divided into inlet and outlet partitions. In some embodiments, the flange portion has a generally s-shaped cross-sectional profile. The flange portion incorporating a modified venturi for improved flow of both inlet and outlet streams through the filter assembly.

20 Claims, 7 Drawing Sheets

U.S. PATENT DOCUMENTS

| | | |
|---|---|---|
| D529,126 S | 9/2006 | Miller |
| D537,502 S | 2/2007 | Miller |
| 7,326,266 B2 * | 2/2008 | Barnwell .................... 55/319 |
| 7,442,220 B2 * | 10/2008 | Pearson et al. ................ 55/418 |
| 7,494,017 B2 * | 2/2009 | Miller ....................... 210/447 |
| 7,503,952 B2 * | 3/2009 | Lane et al. .................... 55/476 |
| 7,550,023 B2 * | 6/2009 | Schuster et al. ............... 55/498 |
| 2005/0092179 A1 * | 5/2005 | Barnwell .................... 95/273 |
| 2006/0059995 A1 | 3/2006 | Gustafson et al. |

FOREIGN PATENT DOCUMENTS

| | | |
|---|---|---|
| EP | 1042045 B1 | 5/2004 |
| EP | 1042044 B1 | 6/2004 |
| EP | 1042046 B1 | 6/2004 |
| EP | 1042046 B1 | 2/2005 |
| EP | 1297880 B1 | 5/2005 |
| GB | 970826 | 9/1964 |
| GB | 2408223 B | 12/2006 |

* cited by examiner

FILTER ASSEMBLY AND METHOD

CROSS-REFERENCE TO RELATED APPLICATIONS

This application is a continuation of U.S. patent application Ser. No. 11/826,474 filed Jul. 16, 2007, U.S. Pat. No. 7,618,480, the contents of which is incorporated herein by reference in its entirety.

FIELD OF THE INVENTION

This invention relates generally to a filter assembly and method for improving flow through the assembly. More particularly, the present invention relates, for example, to a fluid filter assembly having a non-planar flange for directing flow through the assembly.

BACKGROUND OF THE INVENTION

It is known in the art that hydraulic and pneumatic filters may be used to remove particulates, oils and water vapor from fluid mixtures. These filters may also be used to remove odors from breathing air. It is known in the art that compressed air, which has several uses including in food packaging, pharmaceutical labs and integrated circuit manufacturing, may be treated to remove contaminants and water vapor. For instance, in circuit design, it is critical for the compressed air to be devoid of oils and water vapor which can cause a short circuit. Compressed air is treated before use in manufacturing systems to remove water vapor and contaminants from the air that may spoil the end product or at least increase the cost of production by robbing the system of power and efficiency.

Conventional filters, which are used in various applications such as in treating compressed air, may contain a two-piece housing including a filter head and an elongated tubular filter housing. An elongated tubular element is typically removably located within the housing, the tubular elements having annular end caps sealingly bonded at each end of a ring-shaped media. These filters also include a diverter or elbow structure which may direct flow into the filter and provide a means for separating the head casting into inlet and outlet streams, respectively connected to the inner and outer portions of the elongated tubular element.

More recently, filters have utilized a top cap that serves the function of a diverter. These top caps may have a truncated funnel-like configuration removably located within a cylindrical cavity of the head casting. The flow passes through the filter element, which may consist of a media or membrane designed to prevent undesired substances from flowing through the element into the filtrate product stream. Accordingly, filtrate that flows through the media then continues through the outlet port within the head casting. In coalescing filters, the media causes certain condensed liquid components to coalesce and combine the coalesced droplets out of the gaseous product stream while solid particles are trapped by sieving, impaction or Brownian motion.

The shape of the inlet-side surface of the top cap controls the flow geometry of the inlet flow into the element. Similarly, the outlet-side surface of the top cap controls the outlet flow. When the inlet stream directly impacts a wall portion of the top cap, the impact causes turbulence in the fluid flow. As a result, the kinetic energy of the fluid is decreased which increases the velocity of the fluid as it enters the filter element. These filters have included a top cap having a planar flange section which affects inlet flow from the head casting into the filter element. The flange may tend to reduce the effects of turbulence by decreasing the energy of the fluid and disturbing the velocity of the fluid as it enters the filter element. However, the planar flange may still result in turbulent flow in the inlet and outlet streams.

Accordingly, it is desirable to provide a fluid filter assembly having a flange which has inlet-side and outlet-side surfaces that enable more laminar flow of fluid directly into and out of the filter assembly. It is desirable to decrease turbulence because of the pressure drop and also because turbulence causes re-entrainment of condensed fluid in coalescing filters.

SUMMARY OF THE INVENTION

The foregoing needs are met, to a great extent, by the present invention, wherein aspects of a fluid filter assembly having a non-planar flange portion may be used for directing flow through the assembly. Example embodiments of the present invention provide improved flow through a filter element top cap that to a greater extent incorporates a "modified venturi" having a generally diagonal entrance with non-planar surface facing the process flow inlet for in-to-out flow through the element. As such, the novel top cap allows for a smoother transition into the media resulting in lower overall pressure loss. The fluid filter assembly of the present invention enables an inlet connection that directs the process gas directly into the vessel without the use of an elbow or diverter or other similar flow restriction device.

Example embodiments of the present invention relate to a filter assembly having a filter head having inlet and outlet ports and a top cap having a substantially curved, non-planar flange portion, the non-planar flange sealingly received within the filter head such that the filter head is divided into inlet and outlet partitions. The flange portion may incorporate a modified venturi for improved flow of both inlet and outlet streams through the filter assembly. In some embodiments, the flange portion has a generally s-shaped cross-sectional profile. In example embodiments, the non-planar flange is sealingly received within the filter head such that the filter head is divided into inlet and outlet partitions; wherein the top cap directs fluid from the inlet port into the filter element, where the fluid flows through the barrier of filtration media and then out of the assembly through the outlet port.

The filter assembly may also include a filter head having inlet and outlet ports; a filter element housed within a filter bowl, wherein a pressure differential exists across the filter element. The filter element may include a barrier of filtration media, a drain layer and at least one support tube. In example embodiments, a compression tab configured to maintain a compression seal between the filter head and the top cap may be used. A compression tab may also be configured to position the filter element.

In example embodiments of the present invention, the inlet and outlet ports of the filter assembly may be generally inline with one another, which is preferable in compressed gas applications. The assembly may also include a pressure gauge having pressure sensors attached to the filter head for measuring the pressure differential across the filter element. The filter head could include sensor ports for attaching the pressure sensors within the filter head. In example embodiments, the filter bowl is in threaded attachment with the filter head. The filter bowl may then include outer ribs running along an outside surface of the filter bowl for improved hand tightening and loosening of the threaded attachment. The filter head may include a slanted inner top surface for decreasing a volume of the filter head, which is preferable in certain applications.

In example embodiments of the present invention, the filter bowl includes inner ribs running axially along an inside surface of the filter bowl for capillary draining of liquid drops that escape the drain layer. The filter bowl may include an o-ring groove located along an upper outer surface of the filter bowl for forming a pressurized attachment between the filter bowl and the filter head. This o-ring seal isolates the threads from the fluid reducing the possible corrosive effect on the threads. Additionally, the filter bowl may include a baffle located along a bottom inner portion of the filter bowl for quieting the gas to minimize re-entrainment of coalesced liquids. The filter bowl may also include a sight glass for viewing the fluid level.

In some embodiments of the filter assembly of the present invention, a cosmetic cover is configured to mate with a top outer surface of the filter head. When it is desirable to use more than one filtration apparatus, at least one ganging clamp may be used for connecting the filter assembly to at least one other filtration apparatus.

Further contemplating in this invention is a method of directing flow through a filter assembly, comprising: directing flow of a fluid into an inlet port located within a filter head of the filter assembly; passing the fluid from the inlet port into a filter element using a top cap having a substantially curved, non-planar flange portion, wherein the non-planar flange portion is sealingly received within the filter head such that the filter head is divided into inlet and outlet partitions; and passing the fluid out of the assembly through the outlet port.

The method of directing flow through a filter assembly may also include measuring the pressure differential across the filter element. The method of directing flow through a filter assembly may also include capillary draining of liquid drops that escape the drain layer using inner ribs running axially along an inside surface of the filter bowl. The method of directing flow through a filter assembly may also include hand tightening of the filter bowl to the filter head using outer ribs running along an outside surface of the filter bowl. Furthermore, a pressurized attachment between the filter bowl and the filter head may be formed.

In example embodiments of the method of directing flow through a filter assembly in accordance with the present invention, the method also includes minimizing re-entrainment of coalesced fluid using a baffle located along the bottom inner portion of the filter bowl. The method may also include connecting the filter assembly to at least one other filtration apparatus using a plurality of ganging clamps that align the various filter housings. The method may also include clipping the filter element using one or more compression tab(s) and sealing the filter head to the top cap using compression tab(s).

In example embodiments of the present invention, a filter assembly may include: filter head means for containing inlet and outlet ports; filter element means for filtration of a fluid; filter bowl means for housing the filter element, wherein the filter bowl means is attached to the filter head means; and top cap means for dividing the filter head into inlet and outlet partitions; wherein the top cap means includes a substantially curving non-planar flange portion, wherein the non-planar flange is sealingly received within the filter head.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claim appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
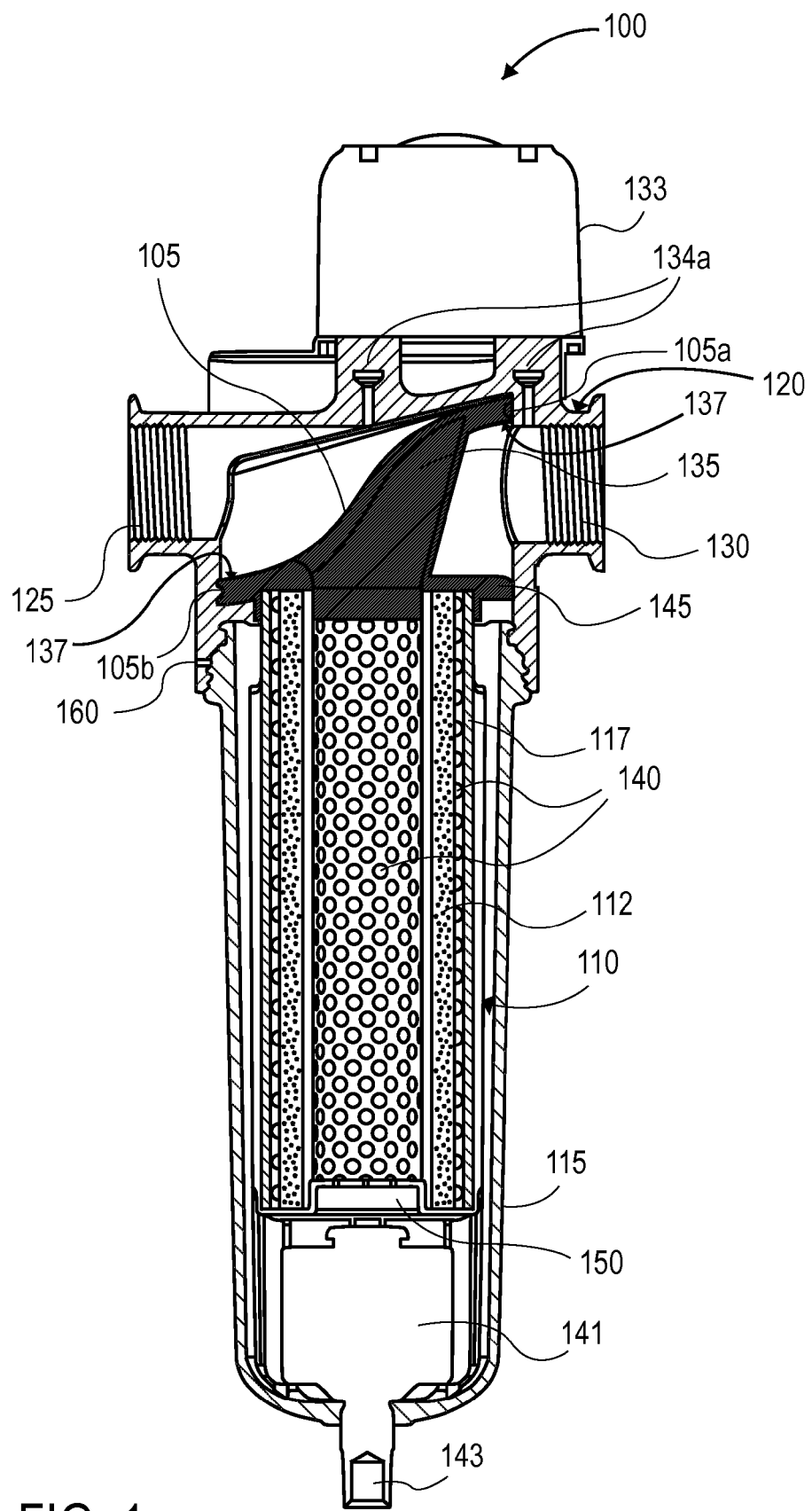
FIG. 1 is a cross-sectional view of a filter assembly having a non-planar flange, according to an embodiment of the present invention.

Various embodiments of the present invention provide for a fluid filter assembly having a non-planar flange portion for directing flow directly into the assembly without the use of an elbow or similar flow restriction device. In some arrangements, the present invention may be utilized in a compressed air or gas system, for example. It should be understood, however, that the present invention is not limited in its application to compressed air systems, but may have application in other fluid separation systems that utilize a filter assembly having a head containing both inlet and outlet ports. Embodiments of the invention will now be further described with reference to the drawing figures, in which like reference numbers refer to like parts throughout.

FIG. 1 is a cross-sectional view of the filter assembly 100, according to an embodiment of the present invention. In example embodiments of the present invention, filter assembly 100 having a non-planar flange portion 105 is provided. Example embodiments of the filter assembly 100 include a filter bowl 115, a tapered filter head 120, a top cap 135 having a non-planar flange portion 105, a bottom cap 150, and a filter element 110, which includes: a filter media 112 surrounded by support tubes 140, and a drain layer 117, which is the outer most layer of the filter element 110. Additionally, a float drain 141 having a closed cell rigid foam float may be attached to the bottom of the bowl 115 to adjust the fluid level within the filter. The float drain 141 includes a float hole 143 that can open and close depending on the level of the float at the bottom of the bowl 115 (discussed further below).

The filter bowl 115 may be threaded with a tapered filter head 120, which includes both threaded inlet and outlet ports, 125 and 130, respectively. The inlet and outlet ports, 125 and 130, respectively, may be generally inline with each other, as shown in FIG. 1, for ease of assembly into a compressed air or gas system. This is because multiple filter assemblies 100 are often used in compressed gas systems, and it is easier to connect assemblies 100 in series when the inlet and outlet ports 125 and 130 share the same center line. As such, no elbow or diverter is needed to connect the multiple filter assemblies 100 and thus, piping the series of assemblies will be made easier and cheaper from a manufacturing standpoint.

In example embodiments of the present invention, a pressure differential exists across the inlet and outlet ports, 125 and 130. In example embodiments, the differential pressure may be from 0 to 10 pounds per square inch (psi) or greater. The filter assembly 100 may also include pressure sensors 134*a*, positioned at the inlet and outlet ports, 125 and 130, for measuring the pressure differential across the filter element 110 using a pressure gauge 133. The pressure at the inlet is higher than the pressure at the outlet and, as such, fluid flows through the filter assembly 100 is driven by the pressure differential. Because the process flow is pressurized during operation, a bleed orifice 160 may be used in such a way as to whistle a warning in the case that an attempt is made to disassemble the assembly 100 while it is under pressure.

In example embodiments of the present invention, the assembly 100 includes top cap 135 having a funnel-like configuration for directing flow into the filter element 110. The top cap 135 is generally horn-shaped, allowing for a smooth transition of the flow into the media 112 resulting in lower overall pressure loss across the inlet and outlet streams. The top surface of top cap 135 may have a curved lip portion described as non-planar flange portion 105. The non-planar flange portion 105 incorporates a "modified venturi" having a generally diagonal entrance facing the process flow inlet for improved in-to-out flow through the filter element 110. The non-planar flange portion 105 is generally s-shaped, or shaped like an ogee, wherein a top-most end 105*a* and a bottom-most end 105*b* of the non-planar flange portion 105 are substantially perpendicular with the inner side wall of the filter head 120 and therefore, form a seal with the inner side wall.

In example embodiments of the present invention, a seal 137 is formed between the top cap 135 and the filter head 120 by mating the top cap 135 with the inner wall of the filter head 120 along the non-planar flange portion 105 to form seal 137, as shown in FIG. 1. Accordingly, all the process flow is driven down into the element 110. In example embodiments of the present invention, the filter assembly 100 also includes a bottom cap 150 for sealing fluid within the filter element 110, thereby forcing all fluid that enters the filter element 110 to pass through the filter media 112 from the inside out.

In example embodiments of the present invention, seal 137 may be formed with the help of a compression tab 145 on the bottom portion of the top cap 135. The compression tab 145 serves the dual purpose of maintaining the proper squeeze (pressure) on the seal 137 while also ensuring proper positioning of the filter element 110 during assembly of the filter assembly 100. In example embodiments of the present invention, a compression tab 145 may be located below the outlet port 130. The compression tab 145 may apply a squeeze to the top cap 135 at the top-most 105*a* and bottom-most ends 105*b* of the non-planar flange portion 105. In some embodiments, the compression tab 145 may become seated against the filter bowl 115 due to being pushed down as a result of the pressure differential.

The compression tab 145 is seated such that it encloses the top portion of each component of the filter element 110, as shown in FIG. 1, to ensure that the inlet fluid flowing into the filter element 110 and out through the media 112. The compression tab 145 positions the filter element 110, ensuring that the required force for sealing the filter element 110 within the assembly 100 is applied. The compression tab 145 is positioned to sit just above the top edge of the bowl 115 once the filter has been assembled so as to keep the element 110 from sliding downward and breaking the pressurized seal. In other embodiments of the present invention, the filter assembly 100 may include more than one compression tab 145.

Figure 2:
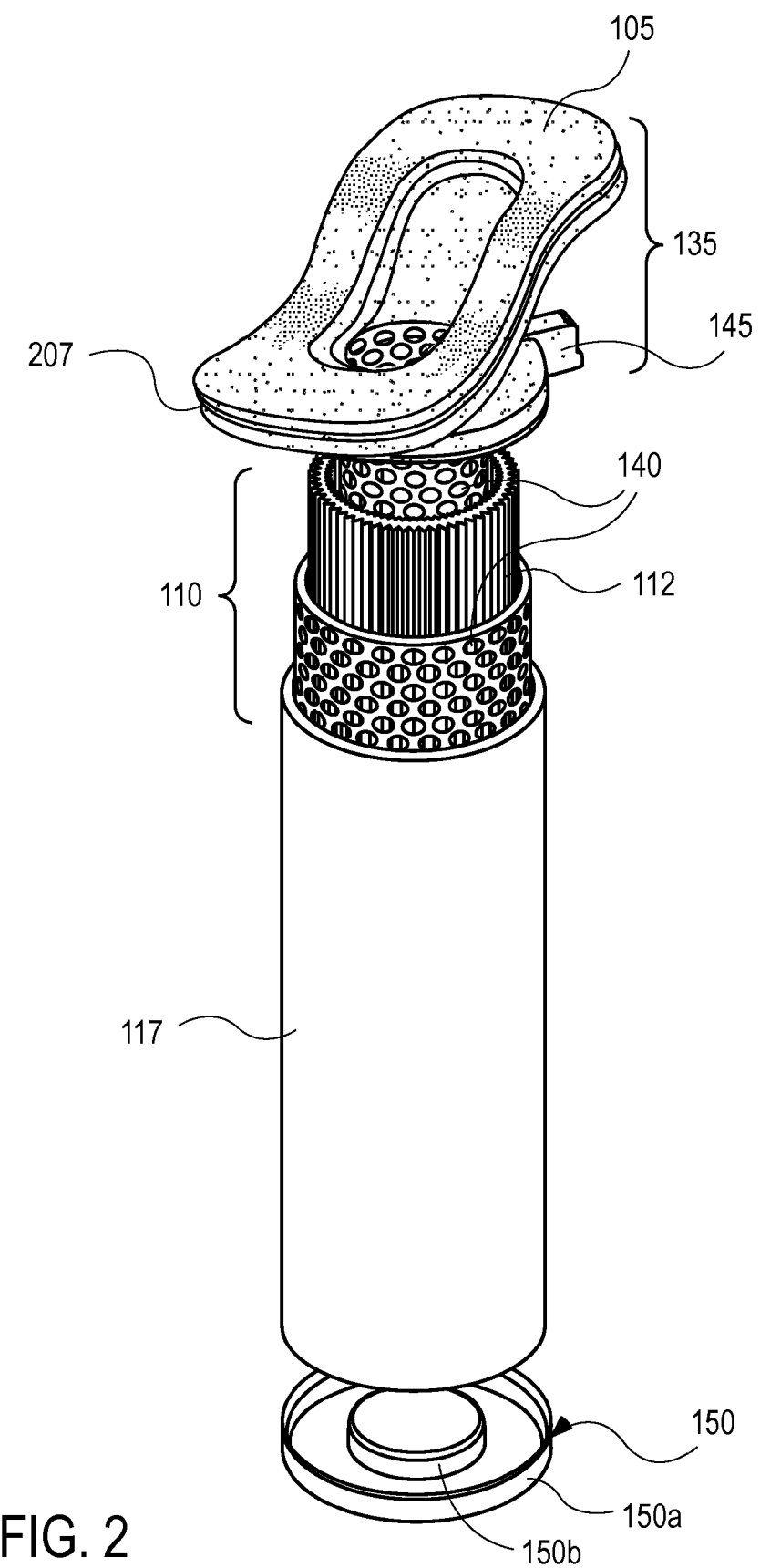
FIG. 2 provides an exploded view of the inner components of the filter assembly of FIG. 1.

FIG. 2 provides an exploded view of the inner components of the filter assembly of FIG. 1. These inner components include the top cap 135, the bottom cap 150 and the individual components of the filter element 110. In addition to the compression tab 145, the top cap 135 may have a groove 207, as shown in FIG. 2, for an o-ring (not shown) which may also be used to help maintain the seal 137. This o-ring seal isolates the threads, which are used in attaching the filter head 120 to the bowl 115, from the fluid reducing the possible corrosive effect on the threads.

The bottom cap 150, used to prevent fluid from flowing through the filter element 110 without passing through the media 112, may also have an outer lip portion 150*a* which mates to form a seal with the drain layer 117 and an inner lip portion 150*b* which is sized to fit within the inner surface of the filter media 112. The bottom end cap 150 is solid (closed off) effectively sealing fluid within the filter element 110, such that all fluid that enters the filter assembly 100 must pass radially through the filter media 112 or in the case of a granular type bed of media, the bottom end cap 150 may be open allowing axial flow through the bed. The bottom cap 150 may be adhered to the drain layer 117 using epoxy adhesive or urethane adhesive to seal.

In example embodiments of the present invention, the filter element 110 may be housed within the filter bowl 115 and which encloses: the filter media 112 surrounded by porous, louvered or perforated metal support tubes 140; the top cap 135 and the bottom end cap 150. The filter may include one, two or more porous, louvered or perforated support tubes 140 designed to support the inner and/or the outer surfaces of a filter media 112 without impeding flow through the filter element 110 while rigidly linking the top cap to the bottom cap. In example embodiments, the filter element 110 includes two support tubes, as shown in FIG. 2. The support tubes 140 may be made of metal or plastic or alternatively, a wire screen that is suitable for providing support to the filter media 112 may be used.

In example embodiments of the present invention, the filter media 112 may be cylindrical wrapped and/or pleated media or alternatively a granular bed of media. The filter media may be made of borosilicate glass and/or various hydrocarbon based materials depending on the desired filtration. A common media is made of borosilicate glass fibers treated with hydrophobic and or oleophobic matter to assist in the coalescing of contaminants and trapping of particulates. In example embodiments of the present invention, several different grades of borosilicate glass or nanofibers may be added to progressively remove solid particulates in the fluid inlet stream in addition to causing fluids to coalesce out of the fluid inlet stream as it passes through the media 112.

In example embodiments of the present invention, in addition to or instead of coalescing media, activated carbon may be used within the media 112 in order to remove contaminants, such as organic vapors, and odors from the fluid stream. The addition of activated carbon may have application in systems for purifying breathing air, for example.

Because pleating increases the surface area of the media 112 and allows for more uniform air to flow through the media 112, spun bonded polyester and nylon scrims may be added to assist in pleating process and maintain separation between pleats of the media 112. In example embodiments of the present invention, the media may include at least: borosilicate glass fibers, activated carbon fibers, polyester fibers, polypropylene fibers, nylon fibers, spun bonded scrim and/or similar media.

Figure 3A:
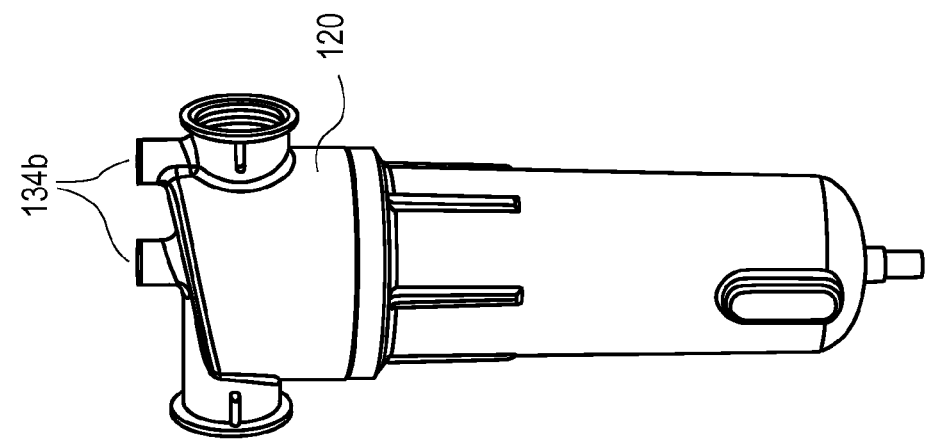
FIG. 3A provides a plan view of the filter assembly of FIG. 1.
Figure 3B:
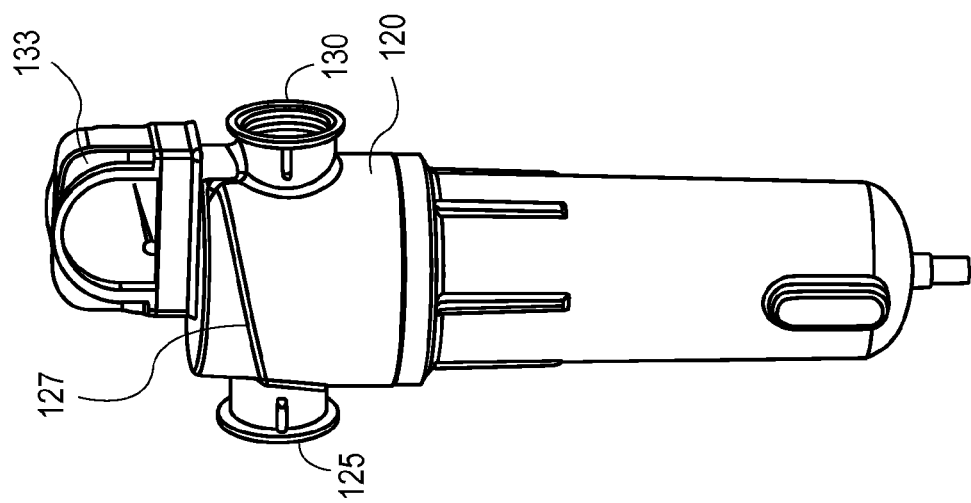
FIG. 3B provides a plan view of the filter assembly of FIG. 1 without the differential pressure gauge.

FIG. 3A provides a plan view of the filter assembly of FIG. 1 and FIG. 3B provides a plan view of the filter assembly of FIG. 1 without the differential pressure gauge. In example embodiments, a differential pressure gauge 133, best shown in FIGS. 3A and 7, measures the pressure differential across the filter element 110. The sensors 134a of the gauge 133 are attached to the filter head 120 via ports 134b, as best shown in FIGS. 3A and 3B. An overall pressure differential drives fluid that enters the assembly 100 through the filter element 110, from the inlet port 125 ultimately out through the outlet port 130. The ports 134b may be threaded for attachment of the pressure gauge 133 and sensors 134a. An o-ring groove 344 for attachment of ganging clamps (not shown in FIGS. 3A and 3B) may be found on the inlet and outlet ports 125 and 130. Ganging clamps are used to attach multiple filter assemblies 100, as discussed below.

Figure 4B:
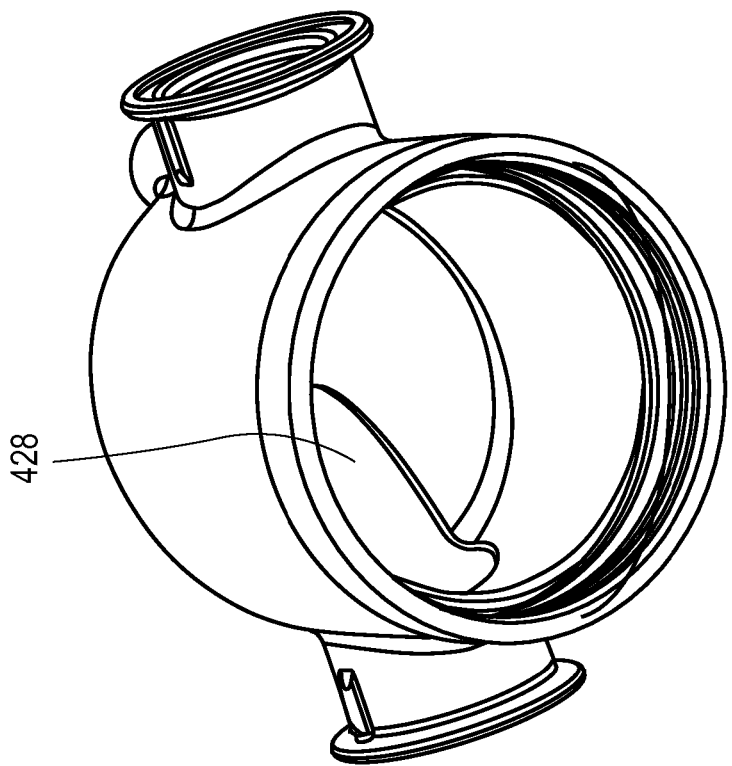
FIG. 4B provides an angled plan view of the bottom of the filter head of the filter assembly of FIG. 1.
Figure 4A:
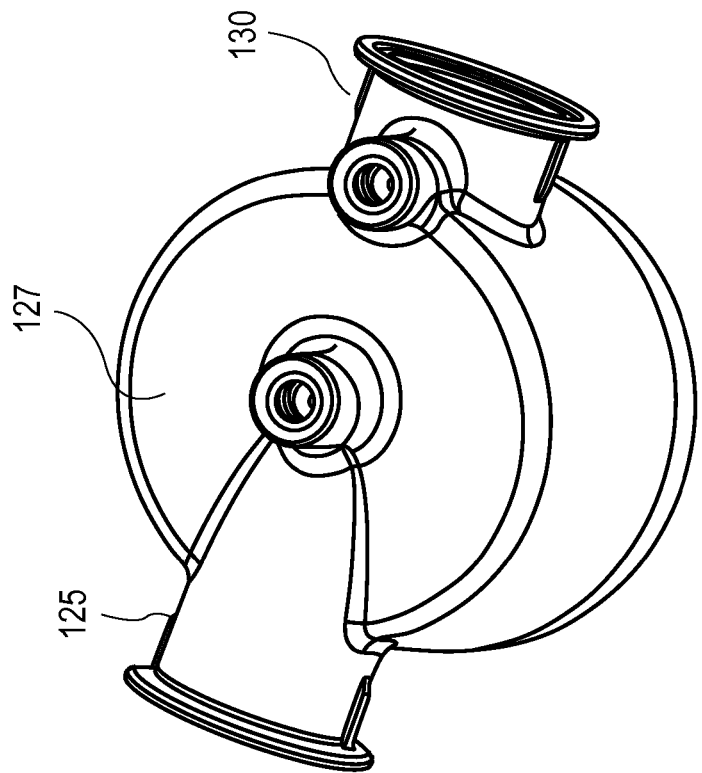
FIG. 4A provides an angled plan view of the top of the filter head of the filter assembly of FIG. 1.

In example embodiments of the present invention, the top outer surface of the filter head 120 has a slanted cylindrical configuration having a diagonal inner top surface 127, as shown in FIGS. 1, 3A and 4A. The inner top surface 127 is slanted in order to minimize the volume of the filter head 120, which may be desired in certain applications. FIG. 4A provides an angled plan view of the top of the filter head 120 of the filter assembly 100 and FIG. 4B provides an angled plan view of the bottom of the filter head 120 of the filter assembly 100. In example methods of using the filter assembly, fluid enters the filter head 120 at the inlet port 125. The top inner surface of the filter head 120 has a sloped portion 428 that curves to compliment the inlet port 125, as best shown in FIG. 4B. The fluid outlet flows out of the filter head 120 through the outlet port 130. As would be appreciated by one of ordinary skill in the art, the filter head 120 of the present invention is novel in its simplicity because there is no need for a diverter component to direct flow into and out of the filter assembly 100.

Figure 5:
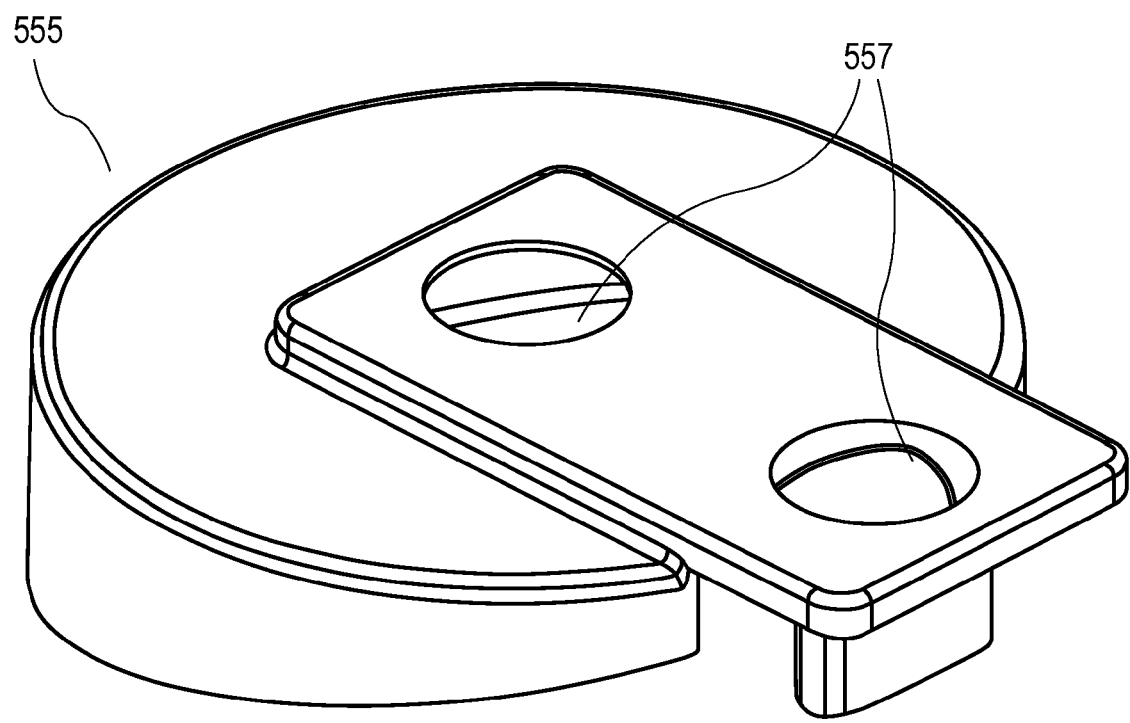
FIG. 5 provides a perspective view of a cosmetic cap for the filter assembly of FIG. 1.

In example embodiments, a cosmetic top cover 555, as best shown in FIG. 5, may be fitted to compliment the slanted top surface 127 of the filter head 120 for esthetic reasons. The top cover 555 would include access ports 557 for attaching sensors 134a to the differential pressure gauge 133 through the filter head 120. The top cover 555 may be made of plastic, metal or any other suitable material. In example embodiments the cover is made of plastic.

Figure 6C:
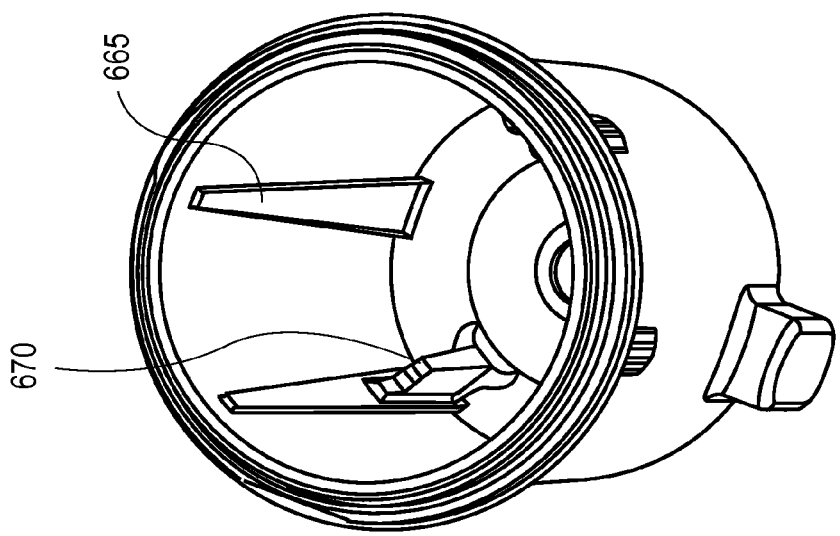
FIG. 6C provides a topical view of the interior of the filter bowl of the filter assembly of FIG. 1.
Figure 6B:
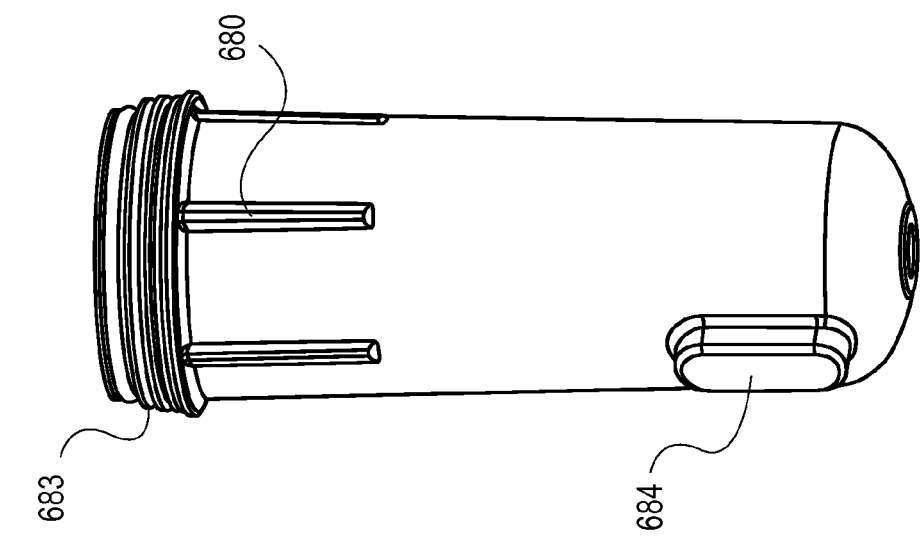
FIG. 6B provides a frontal view of the exterior of the filter bowl of the filter assembly of FIG. 1.
Figure 6A:
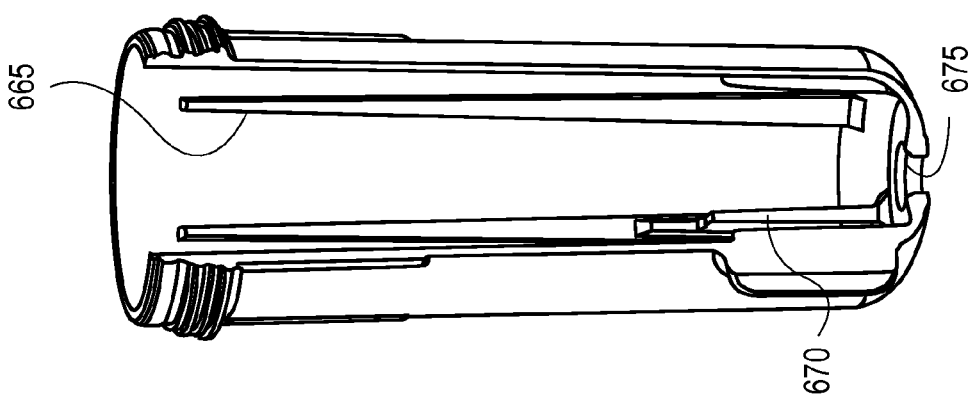
FIG. 6A provides a partially cutaway view of the interior of the filter bowl of the filter assembly of FIG. 1.

Referring now to FIGS. 6A-6C, various views of the filter bowl 115 are provided. Another inventive feature of the present invention is that, in example embodiments, the filter bowl 115 may contain shallow inner ribs 665 running axially along the inside surface of the filter bowl 115, as shown in FIGS. 6A and 6C, for capillary draining of liquid drops that may escape the drain layer 117. For instance, the inner ribs 665 may act as a capillary to drain oil droplets that form on the inside wall of the filter bowl 115 as the amount of oil within the drain layer 117 builds up. As such, the inner ribs 665 force the oil droplets, using capillary action along with gravitational force, to continue to flow down into the float drain 141 and keep the coalesced oil from re-entraining in the outlet fluid stream. In example embodiments of the present invention, outer ribs 680 may be located on the outer surface of the filter bowl 115 to aid in disassembling the filter housing by hand, for instance, when the filter media 112 needs to be replaced.

In example embodiments of the present invention, a baffle 670 may be located along the bottom inner portion of the filter bowl 115 for enhancing dead air space to prevent re-entrainment of the coalesced fluid into the product gas stream. The baffle 670 achieves this by minimizing air circulation that otherwise would result in more turbulent air that would sweep unwanted coalesced liquids back into the product gas stream. The baffle 670 also ensures that the filter element 110 is maintained in a correct position within the element 110. In other example embodiments, the bottom cap 150 may be rested upon the baffle 670.

In example embodiments of the present invention, the filter bowl 115 may also include a drain hole 675 for draining fluids from the filter assembly 100 through the float drain 141 which is attached to the bottom of the filter bowl 115. The float drain 141 may have a snap action for very reliable open/close feature to ensure that none of the product stream may be lost from the outlet stream. Additionally, a sight glass 684 (not shown) may be located near the bottom of the bowl 115 for viewing the fluid level within the float drain 141.

In example embodiments of the present invention, another o-ring (not shown) or some similar sealing mechanism may be present to complete the pressurized attachment between the filter bowl 115 and the filter head 120. The o-ring seal may also have the effect of preventing contaminants from reaching the attaching threads, minimizing corrosion and galling in the threads. An o-ring groove 683 for seating the o-ring may be located at the top of the filter bowl 115, as shown in FIG. 6B.

In example embodiments of the present invention, contaminated fluid enters the filter head 120 of the filter assembly 100 through the inlet port 125. The filter top cap 135 directs fluid from the inlet port 125, along the inner surface of its horn-shaped structure, and into the filter element 110. The inlet fluid would then flow radially out through a cylindrical wrapped or pleated media 112 or alternatively, the fluid could flow axially through a bed of granular-type media 112. The product outlet gas stream would then flow up through the annular space between the filter element 110 and housing 115, being smoothly directed by the bottom portion of the element top cap 135 in the filter head 120 and out of the filter assembly 100 through the outlet port 130.

In certain applications, the media 112 affects adsorption of condensable hydrocarbons and odors within the inlet stream. In coalescing filters, the drain layer 117 has an effect of facilitating the effect of gravity in causing the condensed fluids to drop down into the float drain 117 rather than flowing into the outlet gas stream. The drain layer 117 may be made of open shell foam or needle point felt like polyester or any other material suitable for absorbing coalesced fluids.

The condensed fluid should be drained from the filter assembly 100 before the liquid level reaches the height of the filter element 110. When draining is needed, the float drain 141 lifts up to allow liquid to drain out of the assembly 100. The mechanism of the float drain 141 operates as snap valve, which in some embodiments is magnetic, controlled by the high density foam float 141. When the float 141 rises, as the fluid level rises to a certain height, the valve opens to allow liquid to drain and then shuts off before any product gases escape the filter assembly 100. In example embodiments, the float drain 141 may have a brass stem with o-ring seal for attachment into the filter bowl 115.

Figure 7:
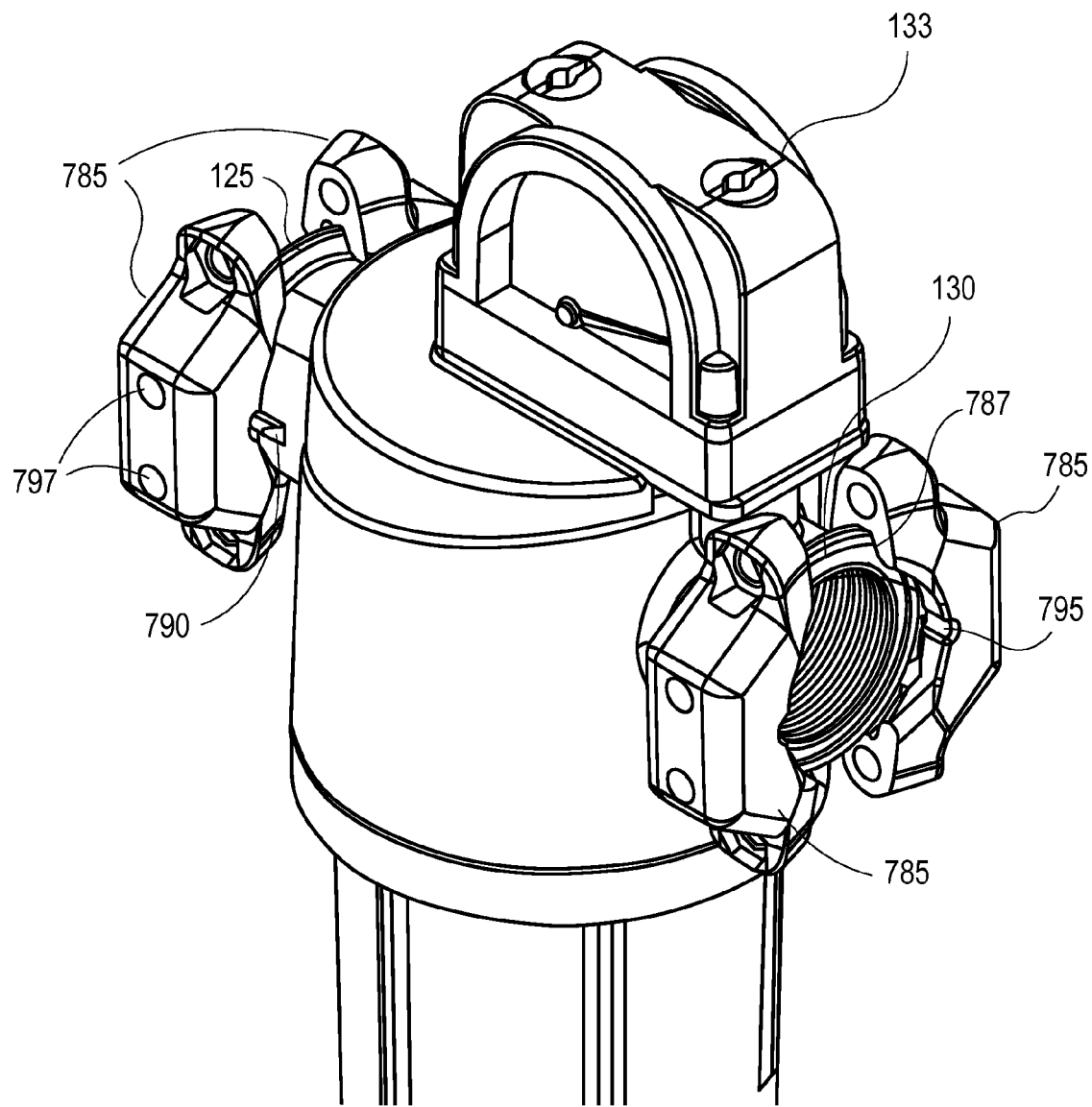
FIG. 7 provides a plan view of the filter assembly of FIG. 1 having ganging clamps attached to the inlet and outlet ports.

In certain applications, it may be desirable to use more than one filter assembly 100 in series to achieve the required degree of filtration. The filter assembly 100 may be attached to a second assembly via ganging clamps 785 attached to inlet port 125 and outlet port 130, as shown in FIG. 7. The ganging clamps 785 may also have tapered sides 787 to "squeeze" the flanges 105 of each filter assembly 100 together. The filter heads 120 include an o-ring groove 344 to provide space for an o-ring (not shown) which forms a seal between the inlet and outlet ports 125 and 130. In these embodiments, the inlet and outlet ports 125 and 130 may have alignment tabs 790 for facilitating the connection of the ganging clamps 785 to the filter head 120. The ganging clamps would have a complimentary indexing key 795 for mating with the alignment tabs 790. The ganging clamps may also include holes 797 for bracket fasteners (not shown) which may be used in wall mounting the assembly 100.

It is understood that, although the filter assembly 100 of the present invention is described as relating to in-to-out flow through the cylinder filter media, the filter assembly 100 may also be reversed using out-to-in flow in some applications with similar results in pressure loss and improved performance due to the non-planar flange 105. For instance, out-to-in flow would be appropriate in applications where there may be particulate high dust loading capacity so that caked on dirt can drop to the bottom of the bowl 115.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of directing flow through a filter assembly, comprising:
    directing flow of a fluid into an inlet port located within a filter head of the filter assembly;
    passing the fluid from the inlet port into a filter element using a top cap having a substantially curved, non-planar flange portion, wherein the non-planar flange portion has a generally s-shaped cross-sectional profile and is sealingly received within the filter head such that the filter head is divided into inlet and outlet partitions; and
    passing the fluid out of the assembly through an outlet port.

2. The method of directing flow through a filter assembly of claim 1, further comprising directing the fluid through a barrier of filtration media of the filter element.

3. The method of directing flow through a filter assembly of claim 1, further comprising hand tightening a filter bowl to the filter head using outer ribs running along an outside surface of the filter bowl.

4. The method of directing flow through a filter assembly of claim 1, further comprising forming a pressurized attachment between a filter bowl and the filter head.

5. The method of directing flow through a filter assembly of claim 1, further comprising minimizing re-entrainment of coalesced fluid using a baffle located along a bottom inner portion of a filter bowl.

6. The method of directing flow through a filter assembly of claim 1, further comprising connecting the filter assembly to at least one other filtration apparatus using a plurality of ganging clamps.

7. The method of directing flow through a filter assembly of claim 1, further comprising clipping the filter element using a compression tab.

8. The method of directing flow through a filter assembly of claim 1, further comprising sealing the filter head to the top cap using a compression tab.

9. A filter assembly comprising:
    a filter head having inlet and outlet ports; and
    a top cap having a substantially curved, non-planar flange portion, the non-planar flange sealingly received within the filter head such that the filter head is divided into inlet and outlet partitions, wherein the flange portion has a generally s-shaped cross-sectional profile.

10. The filter assembly of claim 9, wherein the inlet and outlet ports are generally inline with one another.

11. The filter assembly of claim 9, wherein the filter head includes a slanted inner top surface for decreasing a volume of the filter head.

12. The filter assembly of claim 9, further comprising a filter bowl attached to the filter head and a filter element housed within the filter bowl.

13. The filter assembly of claim 12, wherein the filter bowl includes inner ribs running axially along an inside surface of the filter bowl for capillary draining of liquid drops that escape a drain layer which comprises an outermost portion of the filter element.

14. The filter assembly of claim 12, wherein the filter bowl includes an o-ring groove located along an upper outer surface of the filter bowl for forming a pressurized attachment between the filter bowl and the filter head.

15. The filter assembly of claim 12, wherein the filter element includes a barrier of filtration media, a drain layer and at least one support tube.

16. The filter assembly of claim 9, further comprising at least one compression tab configured to maintain a compression seal between the filter head and the top cap.

17. The filter assembly of claim 9, further comprising at least one compression tab configured to position the filter element.

18. The filter assembly of claim 9, wherein the flange portion incorporates a modified venturi.

19. The filter assembly of claim 9, further comprising at least one ganging clamp for connecting the filter assembly to at least one other filtration apparatus.

20. A filter assembly comprising:
    filter head means for containing inlet and outlet ports;
    filter element means for filtration of a fluid;
    filter bowl means for housing the filter element, wherein the filter bowl means is attached to the filter head means; and
    top cap means for dividing the filter head into inlet and outlet partitions; wherein the top cap means includes a substantially curving non-planar flange portion sealingly received within the filter head, wherein the flange portion has a generally s-shaped cross-sectional profile.

* * * * *